United States Patent
Adams et al.

[15] 3,668,116
[45] *June 6, 1972

[54] SLURRY HYDRODESULFURIZATION OF A HEAVY PETROLEUM OIL

[72] Inventors: Clark E. Adams, Baton Rouge; William T. House, East Baton Rouge Parish, both of La.

[73] Assignee: Esso Research and Engineering Company

[*] Notice: The portion of the term of this patent subsequent to Apr. 28, 1987, has been disclaimed.

[22] Filed: Oct. 16, 1970

[21] Appl. No.: 81,541

Related U.S. Application Data

[63] Continuation of Ser. No. 710,344, Mar. 4, 1968, abandoned.

[52] U.S. Cl. ............................................208/216, 208/213
[51] Int. Cl. .......................................................C10g 23/02
[58] Field of Search .........................................208/216, 213

[56] References Cited

UNITED STATES PATENTS

| | | |
|---|---|---|
| 3,152,981 | 10/1964 | Berlin et al. ............................208/216 |
| 3,322,666 | 5/1967 | Beuther et al. .........................208/216 |
| 3,340,180 | 9/1967 | Beuther et al. .........................208/216 |
| 3,425,934 | 2/1969 | Jacobson et al. .......................208/216 |
| 3,471,399 | 10/1969 | O'Hara ...................................208/216 |
| 3,509,044 | 4/1970 | Adams et al. ...........................208/216 |
| 3,531,398 | 9/1970 | Adams et al. ...........................208/216 |

Primary Examiner—Delbert E. Gantz
Assistant Examiner—G. J. Crasanakis
Attorney—Pearlman and Schlager

[57] ABSTRACT

A heavy petroleum oil is treated in a slurry reactor with hydrogen and with a catalyst containing the oxide or sulfide of a Group VI B metal and the oxide or sulfide of a Group VIII metal deposited on a support of silica-stabilized alumina at reaction temp. of 600°–850° F and 500–5,000 psig. The catalyst is characterized by a maximum of catalyst surface area in pores having pore diameters of 30–70 Angstroms and a minimum of the total pore volume having diameters of over 100 Angstroms. The catalyst is employed in the hydrodesulfurization zone at a concentration of 15–45 pounds/cu.ft., preferably at a concentration of 20 to 30 pounds/cu.ft.

17 Claims, 1 Drawing Figure

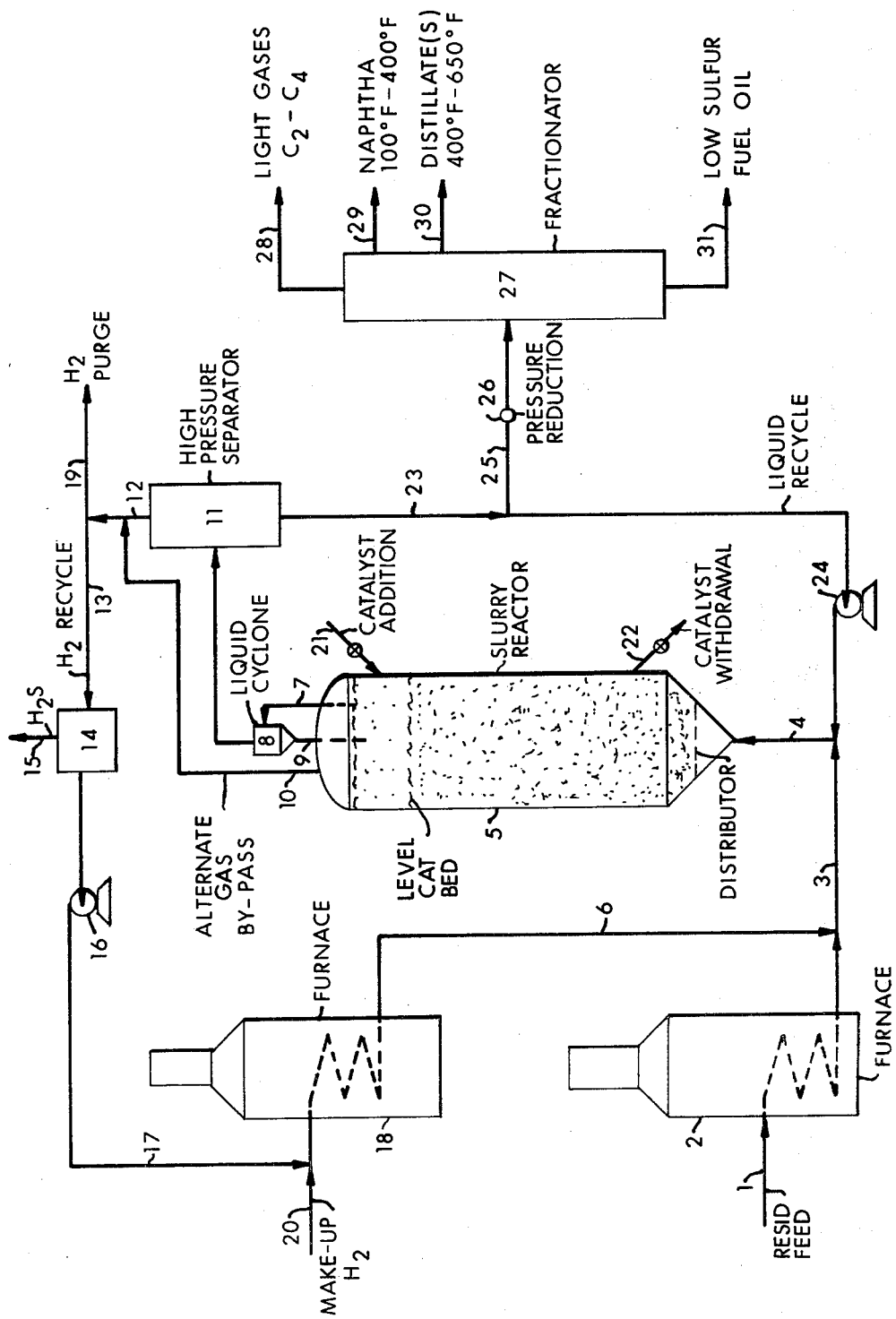

SLURRY HYDRODESULFURIZATION OF A HEAVY PETROLEUM OIL

CROSS-REFERENCE TO RELATED APPLICATION

This application is a continuation of Ser. No. 710,344, filed Mar. 4, 1968 and now abandoned.

This invention relates to an improved hydrodesulfurization process for the production of industrial fuel oil as the major product. More specifically heavy petroleum oils are hydrodesulfurized by treatment in a reactor as an oil-catalyst slurry. A finely divided, attrition resistant catalyst is employed.

Fixed bed, moving bed and fluidized bed hydrodesulfurization processes are considered to be generally unsatisfactory for sustained hydrodesulfurization of heavy petroleum oils for a number of reasons. For example, poor contacting between the oil, the catalyst and hydrogen is encountered. The catalyst surfaces are rapidly deactivated by continuous deposition of metals and coke. The exothermic hydrodesulfurization reaction causes over-heating in packed catalyst beds.

Slurry operation offers a solution to many of the disadvantages of the other types of contacting used for hydrodesulfurization of heavy oils. The essential feature of this method of contacting is a moving three phase system in the reaction zone. The solid catalyst is in oscillating suspension as an expanded or ebbulating bed in the moving liquid oil stream forming a slurry and the hydrogen gas passes through the slurry at a controlled rate.

Since the catalyst cannot be regenerated in situ in a continuous slurry operation, it is necessary to provide an external regenerator or to discard catalyst to maintain continuous slurry operations over an extended period of time such as 3–6 months or more. It is essential that catalyst costs and/or regeneration costs be kept to a minimum. Therefore the specific object of the invention is to provide a slurry hydrodesulfurization process for preparing fuel oil which is carried out at moderate conditions with a catalyst which features low cost and high activity maintenance.

Summarizing briefly, the process comprises treating a heavy petroleum oil in a slurry operation with hydrogen and a catalyst comprising an oxide or sulfide or nickel or cobalt and an oxide or sulfide of molybdenum or tungsten deposited upon a support material made in a particular way and having certain properties. The process is carried out at non-destructive low conversion reaction conditions to produce a maximum amount i.e. 75–100 percent of industrial fuel oil.

The drawing is a flowsheet disclosing a preferred embodiment.

The process feedstock is a heavy petroleum oil. The oil can be an oil fraction such as vacuum gas oil, a topped crude oil or a residual fraction such as atmospheric distillation bottoms or vacuum distillation bottoms. The feed can also be a blend of any of the oils mentioned above. The blend may contain other high boiling materials such as fractions derived from coking, cat cracking, solvent deasphalting, visbreaking, heat soaking, etc. The process is designed to treat a petroleum residuum without any preprocessing, however when the metal content of the oil is greater than about 500–1,000 ppm it may be necessary to employ a metals removal pretreatment step. The most suitable feedstocks for the process of the invention are petroleum residuums having at least 20 vol. percent of material which boils above 1,000° F. Typical feedstocks have the properties and inspections set forth below in Table I.

TABLE I

PROPERTIES OF PETROLEUM RESIDUA

|  | Broad Range | Narrow Range | Safaniya Atmos. Resid |
|---|---|---|---|
| % Boiling Above 1,000°F. | 20–100 | 50–100 | 60 |
| Gravity, °API | −5 to 25 | 10–20 | 15.4 |
| Viscosity, SFS at 122°F. | 50–5,000+ | 100–1,000 | 309 |
| Sulfur, Wt. % | 1–8 | 3–6 | 4.0 |
| Nitrogen, Wt. % | 0–1 | 0.001–0.5 | 0.26 |
| Metals (p.p.m.) Total | 20–1,000 | 80–500 | 127 |
| Vanadium (p.p.m.) | 10–500 | 30–300 | 84 |
| Nickel (p.p.m.) | 5–200 | 10–100 | 32 |
| Asphaltenes, Wt. % | 1–20 | 2–10 | 7.2 |
| Pour, °F. | 0–200 | 25–100 | 45 |

The high activity maintenance catalyst used in the process of the invention comprises a mixture of a salt of a Group VIII metal, e.g. cobalt or nickel and a salt of a Group VIB metal, e.g. molybdenum or tungsten deposited on a support material consisting essentially of 1 to 6 wt. percent silica and 94 to 99 wt. percent alumina.

The finished catalyst has a total pore volume of at least 0.25 cc/g. and a total surface area of at least 150 M²/g. Preferably the total pore volume is at least 0.40 cc/g. and a total surface area of at least 250 M²/g.

In addition, a maximum of the total pore volume, i.e. at least about 100 M²/g. of the surface area, is in pores having a diameter of 30–70 Angstroms.

Furthermore since pores of larger diameter seem to accelerate deactivation of the catalyst in the hydrodesulfurization of petroleum oils it is preferred that the catalyst have a minimum of pores having a diameter of more than 100 Angstroms, i.e. less than 0.25 cc/g.

The procedure followed in the preparation of the support is a most important aspect of the invention.

In general the support can be prepared by precipitating the oxides or hydrated oxides of aluminum and silicon from aqueous solutions of water salts of these metals. For example, suitable proportions of the water soluble salts of aluminum such as the sulfate, chloride or nitrate and suitable proportions of water soluble silicon salts such as sodium silicate are precipitated from solution by adjusting the pH of the solution with acidic or basic material. The precipitate is washed and otherwise treated to remove impurities as necessary. The support can be impregnated with the metals while it is wet or after drying and calcining.

A preferred method preparing the catalysts is to treat alkaline aqueous aluminate solutions which contain predetermined amounts of silica with acidic reagents to precipitate an aluminosilicate in the hydrous form. A slurry produced by this technique is then dried and treated by known methods to furnish a preferred catalyst support of this invention.

The supports of the types prepared above are then impregnated with metals which promote a hydrodesulfurization reaction.

The preferred alkaline aqueous aluminate solution is a solution of sodium aluminate. It is understood that other alkali metal aluminates can be used except they are not preferred from an economic standpoint.

The acidic reagents which can be used are the mineral acid salts of aluminum, e.g., aluminum halides, nitrates, and sulfates. Also useful are the well-known mineral acids themselves, e.g., hydrochloric, nitric, sulfuric acids, and the like.

Preferably, the conditions for preparing the support are so controlled that the finished support has an apparent bulk density of less than 0.70 g./cc. It is further characterized as being opaque as distinguished from glassy in appearance (indicating that a large quantity of the alumina is in a crystalline form). The catalyst is extrudable.

The first variable which must be controlled in preparing the support is the alumina concentration. The alumina concentration, expressed as wt. percent $Al_2O_3$ of the aqueous alkali aluminate solution must be between 1.2 and 5.0, preferably between 1.2 and 3.0 and the most preferred concentration is between 1.2 and 1.7. It is felt that close control of the alumina concentration within the stated ranges is a material factor in producing a support which can be extruded in commercial equipment.

Other important variables include pH and temperature. The precipitation must be effected at a pH between 5 and 9.5, preferably between 6 and 9. Temperatures ranging between 105–120°½ F., preferably 110°–120° F. must be employed.

In the most preferred embodiment the silica-alumina support is prepared in the presence of a material selected from the group consisting of an aldonic acid or an aldonate, preferably a gluconate or gluconic acid. Galactonic acid, arabonic acid, xylonic acid, mannonic acid, and salts thereof can be used as well. Suitable aldonates include the sodium, potassium, zinc, magnesium, calcium, and lithium salts of gluconic acid or other aldonic acids. This material is used in the initial solution in amounts ranging from 0.5 to 6.0 wt. percent based on the $Al_2O_3$ content of the solution. It appears that the addition of aldonates and aldonic acids in the preparation of the silica alumina base has a beneficial effect on the physical characteristics of the final catalyst and its effectiveness in hydrodesulfurization of residua.

In preparing these preferred catalytic materials Table II illustrates preferred conditions and concentrations.

TABLE II

| Conditions | Broad Range | Preferred Range |
| --- | --- | --- |
| I. Concentration of starting aluminate solution, expressed as $Al_2O_3$ | 1.2–5 wt.% | 1.2–1.7 Wt.% |
| II. Precipitation Temperature | 105°–120°F. | 110°–120°F. |
| III. pH | 5–9.5 | 6–9 |
| IV. Reaction Time | ¼–6 Hrs. | ¼–2 Hrs. |
| V. Aldonate or Alconic Acid | 0.5–6 Wt.% | 2–3 wt.% |

Using the above general reaction conditions, the support resulting from the reaction is in the form of a dilute slurry. This slurry may then be concentrated and subjected to spray-drying operations at temperatures ranging between 200°–2,000° F., preferably 200°–500° F. Spray drying, particularly at the stated conditions preserves the catalyst base in the desired spheroidal form.

Using conventional techniques known to the catalyst art, the spray-dried material may be subjected to water washing to remove excess alkali metal ions and sulfate ions. The support can then be impregnated with the catalytic metals and extruded or pilled or otherwise formed into any desired physical form.

The aforementioned silica-alumina hydrogels can be composited with other synthetic and/or semi-synthetic aluminas, silica gels, and/or other silica-alumina-clay hydrogel compositions for the purpose of adjusting the alumina and/or silica present during impregnation. The resulting catalyst when calcined, should have a total surface area greater than 150 $M^2/g$. and the pore volume is preferably greater than 0.25 cc./g. as measured by the BET procedure with nitrogen.

The active metallic components in the finished catalyst are a Group VIB salt, specifically a molybdenum salt or tungsten salt selected from the group consisting of molybdenum oxide, molybdenum sulfide, tungsten oxide, tungsten sulfide, and mixtures of these and a Group VIIIB salt, specifically a nickel or cobalt salt selected from the group consisting of nickel oxide, cobalt oxide, nickel sulfide and cobalt sulfide and mixtures of these. The preferred active metal salt combinations are nickel oxide with molybdenum oxide and cobalt oxide with molybdenum oxide. Oxide catalysts are preferably sulfided prior to use.

The final catalyst contains the following amounts of each component.

TABLE III

CATALYST COMPOSITION

| | Broad Range (Wt.%) | Preferred Range (Wt.%) |
| --- | --- | --- |
| Nickel or Cobalt (as oxide) | 1 to 15 | 2 to 10 |
| Tungsten or Molybdenum (as oxide) | 5–25 | 10–20 |
| Silica | 1 to 6 | 1.5 to 5 |
| Alumina | 93 to 54 | 86 to 65 |

EXAMPLE 1

The following illustrates a typical catalyst preparation. Three solutions are prepared, e.g., A, B, and C.

| | Ingredient | Amount |
| --- | --- | --- |
| Solution A* | Water | 36 Gallons |
| | Sodium Silicate Solution — 28% $SiO_2$ | 113 cc. |
| | Sodium Aluminate — 23.5% $Al_2O_3$ Solution | 5,323 cc. |
| | 48% Gluconic Acid Solution | 76 cc. |
| Solution B | 98% $H_2SO_4$ | 850 cc. Into 4.5 Gallons Water |
| Solution C | 9.5% Alum. Solution | 3.3 Gallons |

*Total $Al_2O_3$ in solution — 1.3%

Solution B is added to Solution A over a period of 23 minutes. At this point the temperature of the reaction mixture is 118° F. Solution C is then added to the mineral acid solution over a 19-minute period. The temperature during addition remains at 118° F. The final pH, after the above additions, is 8.8. The slurry was filtered, reslurried, spray dried, washed to remove soluble salts, and redried.

The finished silica-alumina support has a pore volume of 2.36 cc./g., a surface area of 310 $M^2/g$., and an apparent bulk density of 0.18 g./cc.

EXAMPLE 2

A silica-alumina support is prepared in the manner set forth in Example 1 and is composited with suitable quantities of molybdenum oxide and cobalt carbonate by impregnation. The slurry is filtered and dried to provide a catalyst (dry weight basis containing 3.5 percent cobalt oxide, 12.0 percent molybdenum oxide, 1.7 percent $SiO_2$, and the balance alumina). The support can be impregnated with the other hydrogenation metals of the invention, i.e., nickel and tungsten in the same manner. As stated previously the catalyst is sulfided prior to use.

The structure of the catalyst is also an important aspect of the invention. In the hydrodesulfurization of petroleum residue a criticality of pore size has been found with respect to activity maintenance. It has been found that pores having a pore diameter in the 30–70Å range are of critical importance with heavy residual feeds. Evidently pores of smaller diameter than about 30Å are ineffective in desulfurizing the high molecular weight molecules present in residues and pores of larger diameter than about 70Å are rapidly deactivated. Thus a maximum of surface area i.e. 40 to 100 percent should be present in pores having a pore diameter in the 30–70Å range and a minimum of pores should be present in pores having a pore diameter of over 100Å i.e. less than about 20.

Catalysts having good activity and activity maintenance for hydrodesulfurization of residua are characterized by the following relationship between pore diameter in Å, pore volume in cc./g. and surface area in $M^2/g$. for pores over the range of 30–70Å in diameter.

$$\frac{4 \times 10^4 \times \text{Pore Volume (cc./g.)}}{\text{Pore Diameter, Å}} > 100 \, M^2/g. \text{ Surface Area}$$

The pore volume distribution of a catalyst as defined by this invention is measured by nitrogen adsorption isotherm where the volume of nitrogen absorbed is measured at various pressures. This technique is described in Ballou, et al., Analytical Chemistry, Vol. 32, Apr. 1960, pp. 532–536. The pore diameter distributions for the examples of the invention were obtained using a Model No. 4–4680 Adsorptomat manufactured by the American Instrument Company, Silver Springs, Md. One skilled in the art can select catalyst manufacturing process steps and process conditions within the specific ranges disclosed herein to prepare catalysts having the required pore diameter, pore size distribution, pore volume, and surface area.

Generally the catalyst particles will range in size from 50 microns to 10,000 microns preferably 100 microns to 1,000 microns with a relatively narrow size range of less than 1 to 4 ratio. The preferred shape is spheroidal although extrudates are suitable.

Referring to the drawing a heavy petroleum oil such as the Safaniya atmospheric residuum described in Table I is passed by line 1 to furnace 2 for preheating to a temperature in the range of 600° to 750° F. The hot liquid feed is passed by lines 3 and 4 into upflow slurry reactor 5. Hydrogen preheated to supply the remaining heat to the reactor is added to the oil by line 6. The oil passes upwardly through the reactor intimately mixing with the moving catalyst particles to form a slurry. Both the oil and the hydrogen gas transmit a lifting force to the solid catalyst particles holding them in oscillating suspension in the upwardly moving fluid. Treated oil, spent gas and a small quantity of catalyst pass overhead via line 7 into liquid cyclone 8. Catalyst is separated and returned by line 9. An alternate gas bypass line 10 can be used to adjust gas flow. The liquid-gas overhead phase is passed to high pressure separator 11. Gas is separated and passed by lines 12 and 13 to a conventional gas separator 14. $H_2S$ and other impurities are separated from the recycle hydrogen and removed from the process by line 15. Hydrogen is recycled by means of compressor 16, line 17, furnace 18 and line 6. A portion of the spent hydrogen can be purged by line 19. Makeup hydrogen is added by line 20. Make up catalyst is added to the reactor as required by line 21 and spent catalyst is removed by line 22.

Liquid conversion products are removed from separator 11 by line 23. A portion of the treated oil is recycled utilizing lines 23 and 4 and pump 24. The remainder is passed via line 25 and pressure reduction valve 26 to distillation zone 27. From the distillation zone light gases (i.e. $C_2 - C_4$) are removed by line 28, naphtha (B.R. 100°–400° F.) is removed by line 29, a distillate fraction (B.R. 400°–650° F.) is removed by line 30 and the principal product of the process — low sulfur fuel oil is recovered by line 31.

The embodiment shown in the drawing relates to the mode of operation in which the catalyst is not regenerated. It is also within the concept of the invention to flow a slurry of oil and catalyst around a system equipped with an external regenerator. In this method of operation the catalyst is removed from the oil and regenerated by conventional means such as burning with air and the regenerated catalyst and makeup fresh catalyst are reslurried with the oil for return to the reactor. It is also within the concept of the invention to pass the oil or the slurry downwardly through the reactor counter-current to upflowing gas.

The slurry hydrodesulfurization described herein is capable of providing at least a 30 percent reduction in the sulfur content of the feed and a reduction of 30–80 percent of the sulfur in an oil containing 1–5 wt. percent sulfur is easily obtained.

The severity of the reaction is controlled to limit conversion of 1,000° F.+ material to lower boiling materials to less than 25 vol. percent of the feed and usually to less than 10 vol. percent of the feed. Typical reaction conditions are as follows.

TABLE IV

Reaction Conditions — Slurry Nondestructive Hydrodesulfurization

| | Broad Range | Preferred Range |
|---|---|---|
| Temperature, °F. | 600–850 | 650–750 |
| Pressure, psig | 500–5000 | 1000–3000 |
| Fresh Feed Rate, W/Hr./W on Cat | 0.1/1 to 10/1 | 0.5/1 to 5/1 |
| Liquid Recycle Ratio on Feed | 2/1 to 20/1 | 5/1 to 15/1 |
| Hydrogen Rate, SCF/Bbl of Fresh Feed | 500–10,000 | 1000–5000 |
| Liquid Velocity, Ft./Sec. | 0.001–0.08 | 0.005–0.05 |
| Catalyst Concentration, Lb./Ft.$^3$ | 15–45 | 20–30 |

A number of variables can be adjusted to obtain the desired slurry of oil and catalyst in the reactor. These include liquid flow rate, gas flow rate, reactor size and shape and the size, shape and density of the catalyst.

EXAMPLE 3

This example describes a low conversion, moderate desulfurization type of operation. The feed is an atmospheric residuum having an initial boiling point of about 650° F., an API gravity of about 13°, a sulfur content of 4.0 wt. percent and other properties similar to thos listed for Safaniya residuum in Table I of this disclosure. The feed is reacted as a slurry with a sulfided cobalt molybate on silica alumina catalyst. The silica content is about 1.8 percent. From 50 to 80 percent of the surface area of the catalyst is in pores having a pore diameter of 30–70A. The reaction conditions include a temperature of 700° F., a pressure of 1,500 psig and a hydrogen consumption rate of 400 SCF/Bbl. At these conditions about 60 percent desulfurization is obtained yielding about 95 percent of 650° F. + fuel oil having a sulfur content of 1.6 percent and a metals content of about 85 ppm.

EXAMPLE 4

When the Safaniya residuum feed of Example 3 is treated at more severe conditions including a temperature of 750° F., a pressure of 3,000 psig and a hydrogen consumption of 1,000 SCF/Bbl., the 650° F. + plus fuel oil is 90 percent desulfurized yielding a product containing about 0.4 wt. percent sulfur. The metals content is reduced from over 100 ppm to about 35 ppm. This fuel oil meets all the current governmental requirements for low sulfur fuel oil. At the operating conditions of this example about 20 percent of the 1,000° F. + material is converted to 1,000° F. − material including 10 percent (based on feed) of a distillate fraction containing about 0.1 wt. percent sulfur, 1 to 2 percent naphtha and 2 to 3 percent light ends.

The examples show that a residuum containing 4 percent sulfur can be converted into 80–95 percent of 650° F. + fuel oil in a slurry hydrodesulfurization operation at mild conditions and relatively low hydrogen consumption. The high activity catalyst employed will permit continuous operations up to 6 months. In one embodiment catalyst activity is maintained by continuous addition and removal and in another embodiment catalyst activity is maintained by regeneration.

The use of slurry operation enables the operator to maintain close control over the exothermic reaction taking place in the reactor. In a preferred embodiment shown in the drawing hydrogen is heated separately from the feed. Thus the gas can carry the main heat load with the fresh feed being heated only to the extent required for process control. This technique minimizes heat degradation of the feed. Liquid product recycle provides a heat sink within the reactor.

What is claimed is:

1. In an ebullient bed slurry hydrodesulfurization process for the hydrodesulfurization of a heavy petroleum oil comprising contacting a slurry of heavy petroleum oil and a catalyst in a reactor with from 500 to 10,000 standard cubic feet of hydrogen per barrel (SCF/B) of fresh heavy petroleum oil at a temperature in the range of 600° – 850° F. and a pressure of from 500 to 5,000 psig and recovering a low sulfur fuel oil, the improvement which comprises employing said catalyst in the hydrodesulfurization zone at a concentration of 15 to 45 pounds/cu. ft. and said catalyst comprising the oxide or sulfide of a Group VIB metal and the oxide or sulfide of a Group VIII metal deposited on a support material comprising a silica-stabilized alumina containing 1–6 wt. percent silica, said catalyst having a maximum of its surface area present in pores having a pore diameter in the 30 – 70A range, and a minimum of the total pore volume present in pores having a pore diameter of over 100a.

2. The process of claim 1 wherein said catalyst has a surface area of at least 250 $M^2/g.$, more than 50 percent of which is in pores having pore diameters ranging from 30 to 70A, and a minimum of the total pore volume being in pores having pore diameters greater than 100A.

3. The process of claim 1 wherein said catalyst is the oxide or sulfide of cobalt with the oxide or sulfide of molybdenum deposited on said support.

4. The process of claim 1 wherein said catalyst is the oxide or sulfide of nickel with the oxide or sulfide of tungsten deposited on said support.

5. The process of claim 1 wherein the heavy petroleum oil is a vacuum gas oil.

6. The process of claim 1 wherein the heavy petroleum oil is an atmospheric residuum.

7. The process of claim 1 wherein the heavy petroleum oil is a vacuum residuum.

8. The process of claim 1 wherein said heavy petroleum oil is contacted with from 1,000 to 5,000 standard cubic feet of hydrogen per barrel of fresh heavy petroleum oil, said hydrodesulfurization is conducted at a temperature varying from 650° to 750° F. and at a pressure varying from 1,000 to 3,000 psig.

9. The process of claim 1 wherein said hydrodesulfurization is conducted at a temperature varying from 650° to 750° F.

10. The process of claim 2 wherein said catalyst is the oxide or sulfide of cobalt with the oxide or sulfide of molybdenum deposited on said support.

11. The process of claim 2 wherein said catalyst is the oxide or sulfide of nickel with the oxide or sulfide of tungsten deposited on said support.

12. In an ebullient bed slurry hydrodesulfurization process for the hydrodesulfurization of a petroleum residuum containing 1–8 wt. percent sulfur and containing at least 50 wt. percent of materials boiling above 1,000° F. comprising contacting a slurry of said residuum and a catalyst in a reactor with 1,000 to 5,000 standard cubic feet per barrel (SCF/B) of hydrogen at a temperature in the range of 600° – 850° F. and a pressure of from 1,000 to 3,000 psig and recovering at least 75 percent low sulfur fuel oil, the improvement which comprises employing said catalyst in the hydrodesulfurization zone at a concentration of 20 to 30 lbs./cu. ft. and said catalyst comprising the oxide or sulfide of a Group VIB metal and the oxide or sulfide of a Group VIII metal deposited on a support material comprising a silica-stabilized alumina containing 1–6 wt. percent silica, said catalyst having a maximum of its surface area present in pores having a total pore diameter in the 30–70A range, and a minimum of the pore volume present in pores having a pore diameter of over 100A.

13. The process of claim 12 wherein the improvement is further characterized by said catalyst having a surface area of at least 250 $M^2/g$, more than 50 percent of which is in pores having pore diameters ranging from 30 to 70A, and a minimum of the total pore volume being in pores having pore diameters greater than 100A.

14. The process of claim 12 wherein the improvement is further characterized by said catalyst being the oxide or sulfide of cobalt with the oxide or sulfide of molybdenum deposited on said support.

15. The process of claim 12 wherein the improvement is further characterized by said catalyst being the oxide or sulfide of nickel with the oxide or sulfide of tungsten deposited on said support.

16. The process of claim 12 wherein the hydrodesulfurization process employs a feed material comprising an atmospheric residuum.

17. The process of claim 12 wherein the hydrodesulfurization process employs a feed material comprising a vacuum residuum.

* * * * *